United States Patent
Maccagnan et al.

(10) Patent No.: US 9,308,683 B2
(45) Date of Patent: Apr. 12, 2016

(54) DRY CALIBRATION DEVICE FOR EXTRUDERS

(71) Applicant: GIMAC DI MACCAGNAN GIORGIO, Castronno (IT)

(72) Inventors: Giorgio Maccagnan, Castronno (IT); Alberto Bertuletti, Daverio (IT); Tiziano Capelletti, Buguggiate (IT)

(73) Assignee: GIMAC DI MACCAGNAN GIORGIO, Castronno (IT)

( * ) Notice: Subject to any disclaimer, the term of this patent is extended or adjusted under 35 U.S.C. 154(b) by 0 days.

(21) Appl. No.: 14/381,422

(22) PCT Filed: Feb. 20, 2013

(86) PCT No.: PCT/IB2013/051362
§ 371 (c)(1),
(2) Date: Aug. 27, 2014

(87) PCT Pub. No.: WO2013/128337
PCT Pub. Date: Sep. 6, 2013

(65) Prior Publication Data
US 2015/0125562 A1    May 7, 2015

(30) Foreign Application Priority Data

Feb. 28, 2012    (IT) ............................ MI2012A0299

(51) Int. Cl.
    *B29C 47/90*        (2006.01)
    *B29C 47/92*        (2006.01)
    *B29C 47/88*        (2006.01)
    *B29C 47/00*        (2006.01)
    *B29C 47/08*        (2006.01)

(52) U.S. Cl.
CPC ............. *B29C 47/92* (2013.01); *B29C 47/0023* (2013.01); *B29C 47/881* (2013.01); *B29C 47/882* (2013.01); *B29C 47/8835* (2013.01); *B29C 47/903* (2013.01); *B29C 47/904* (2013.01); *B29C 47/905* (2013.01); *B29C 47/908* (2013.01); *B29C 47/0842* (2013.01)

(58) Field of Classification Search
CPC ............ B29C 47/0023; B29C 47/0842; B29C 47/881; B29C 47/882; B29C 47/8835; B29C 47/8895; B29C 47/903; B29C 47/904; B29C 47/905; B29C 47/908; B29C 47/92
See application file for complete search history.

(56) References Cited

U.S. PATENT DOCUMENTS

| | | | |
|---|---|---|---|
| 3,668,288 A * | 6/1972 | Takahashi | 264/46.1 |
| 4,288,905 A * | 9/1981 | Kessler | 29/525.09 |
| 5,288,218 A | 2/1994 | Melkonian | |
| 5,316,459 A | 5/1994 | Melkonian et al. | |
| 6,200,119 B1 | 3/2001 | Pelto et al. | |
| 6,520,759 B2 | 2/2003 | Kitayama et al. | |
| 2002/0048614 A1 | 4/2002 | Kitayama et al. | |
| 2010/0196643 A1 | 8/2010 | Dugard et al. | |

FOREIGN PATENT DOCUMENTS

| | | |
|---|---|---|
| DE | 19854932 A1 | 10/1999 |
| EP | 0925900 A1 | 6/1999 |
| JP | H08336887 A | 12/1996 |

* cited by examiner

*Primary Examiner* — James Sanders
*Assistant Examiner* — Joseph Leyson
(74) *Attorney, Agent, or Firm* — Pearne & Gordon LLP

(57) ABSTRACT

Described is a dry calibration device for extruders comprising a calibration head (2) having a calibration duct (3); the device also comprising a heat exchange jacket (5) positioned in contact with the calibration head (2) and suction means (9) associated with the calibration duct (3), while the heat exchange jacket (5) comprises a thermally conductive element (6) positioned in contact with an outer surface (4*a*) of the calibration head and forming a contact surface (6*a*) extending continuously along a longitudinal axis (6A) of extension of the calibration head (2).

4 Claims, 3 Drawing Sheets

DRY CALIBRATION DEVICE FOR EXTRUDERS

FIELD OF THE INVENTION

This invention relates to a dry calibration device for extruders, such as, for example, for machinery which produces thermoplastic polymer pipes by extrusion. This device is used after drawing/extruding the pipe to complete the processing by dry calibration. The term "calibration" means the operation of stretching the outer surface of the pipe with the aim of smoothing it and eliminating any creases, as well as giving the manufactured product the exact diameter.

DESCRIPTION OF RELATED ART

In the prior art, the above-mentioned operation is performed by a device comprising a calibration head, formed by a duct (metallic or made from other materials, such as, for example, glass and/or Teflon) in which the manufactured product to be calibrated is inserted. The duct has an inlet section which, in use, faces the outlet of a drawing machine, and an outlet section opposite the inlet section. The drawing head has a plurality of suction openings which, leading to the inside of the duct, allow a negative pressure to be created with the purpose of stretching the walls of the pipe.

To cool the extruded manufactured product, the device comprises a cooling jacket which surrounds the calibration head. The cooling jacket comprises a plurality of cooling components, axially alternating, along the extension of the duct, with suitably spaced suction ducts.

The prior art device has a cylindrical shape and also comprises a flange connected to the calibration head, in particular at the inlet section of the duct. The purpose of the flange is to anchor the calibration head, keeping it in a fixed position relative to the drawing machine. Disadvantageously, the device described above has a periodic temperature trend in the calibration head. In other words, the temperature has a trend with peaks at the separation zones between one cooling component and the next (where the cooling is less efficient) and troughs close to each cooling circuit. As well as resulting in a loss of efficiency of the device, this can cause surface irregularities in the pipe at the outfeed from the calibration device, with a consequent loss of quality.

The presence of the flange also causes a temperature peak at the duct inlet section, since it is extremely difficult to cool the flange (or, more generally, check the thermal profile).

In this context, the technical purpose which forms the basis of the present invention is to propose a dry calibration device which overcomes the above mentioned disadvantages of the prior art.

AIMS AND SUMMARY OF THE INVENTION

More specifically, the aim of this invention is to provide a dry calibration device which is able to guarantee a uniform processing of the pipes.

Another aim of the invention is to propose a dry calibration device which is able to prevent temperature peaks inside the manufactured products being calibrated. The technical purpose indicated and the aims specified are substantially achieved by a dry calibration device for extruders comprising the technical features described in one or more of the appended claims.

BRIEF DESCRIPTION OF THE DRAWINGS

Further features and advantages of the invention are more apparent in the non-limiting description which follows of a preferred embodiment of a dry calibration device as illustrated in the accompanying drawings, in which.

DETAILED DESCRIPTION OF PREFERRED EMBODIMENTS OF THE INVENTION

Figure 1:
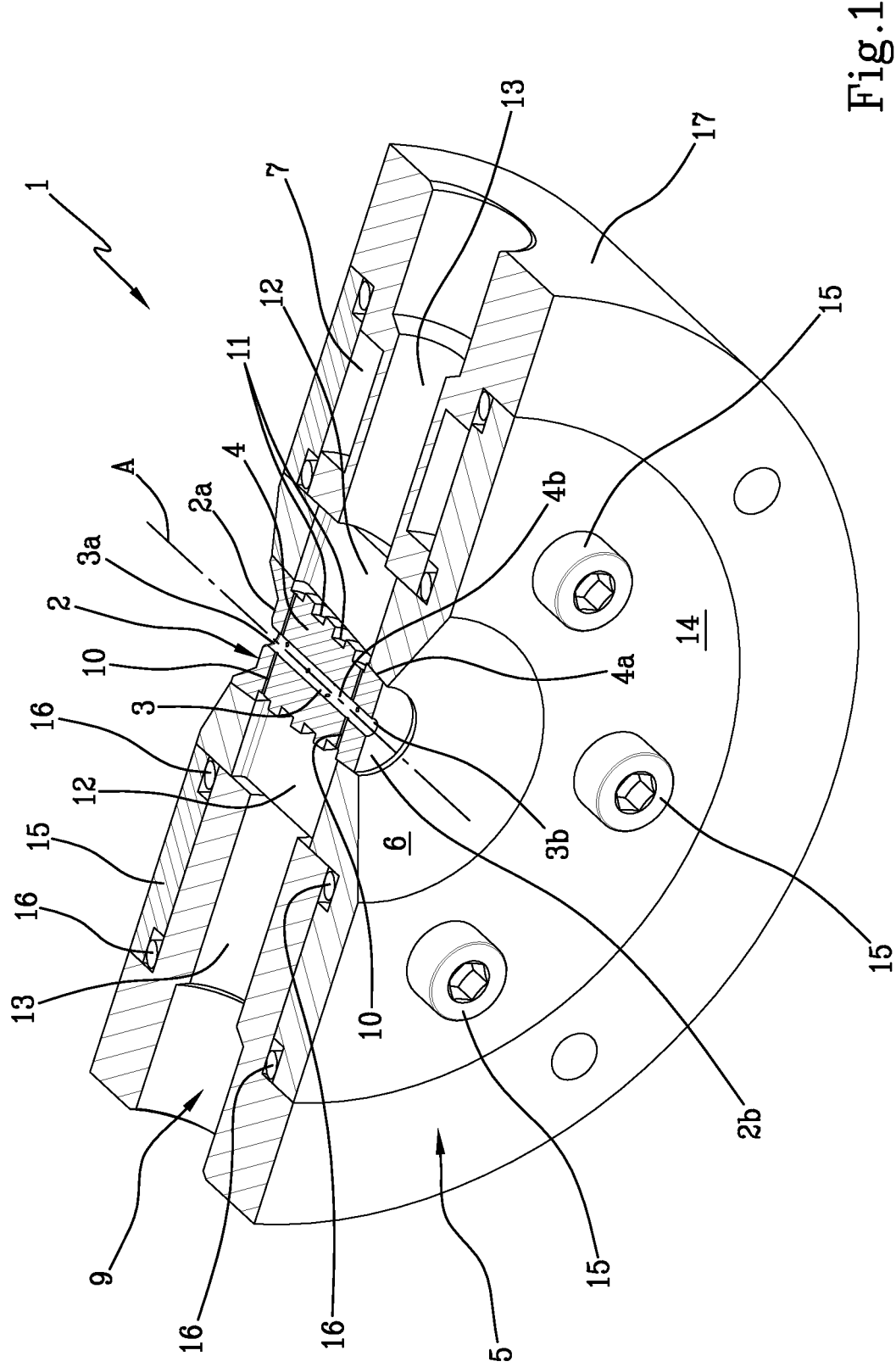
FIG. 1 is a cross-section of a dry calibration device according to this invention.
Figure 2:
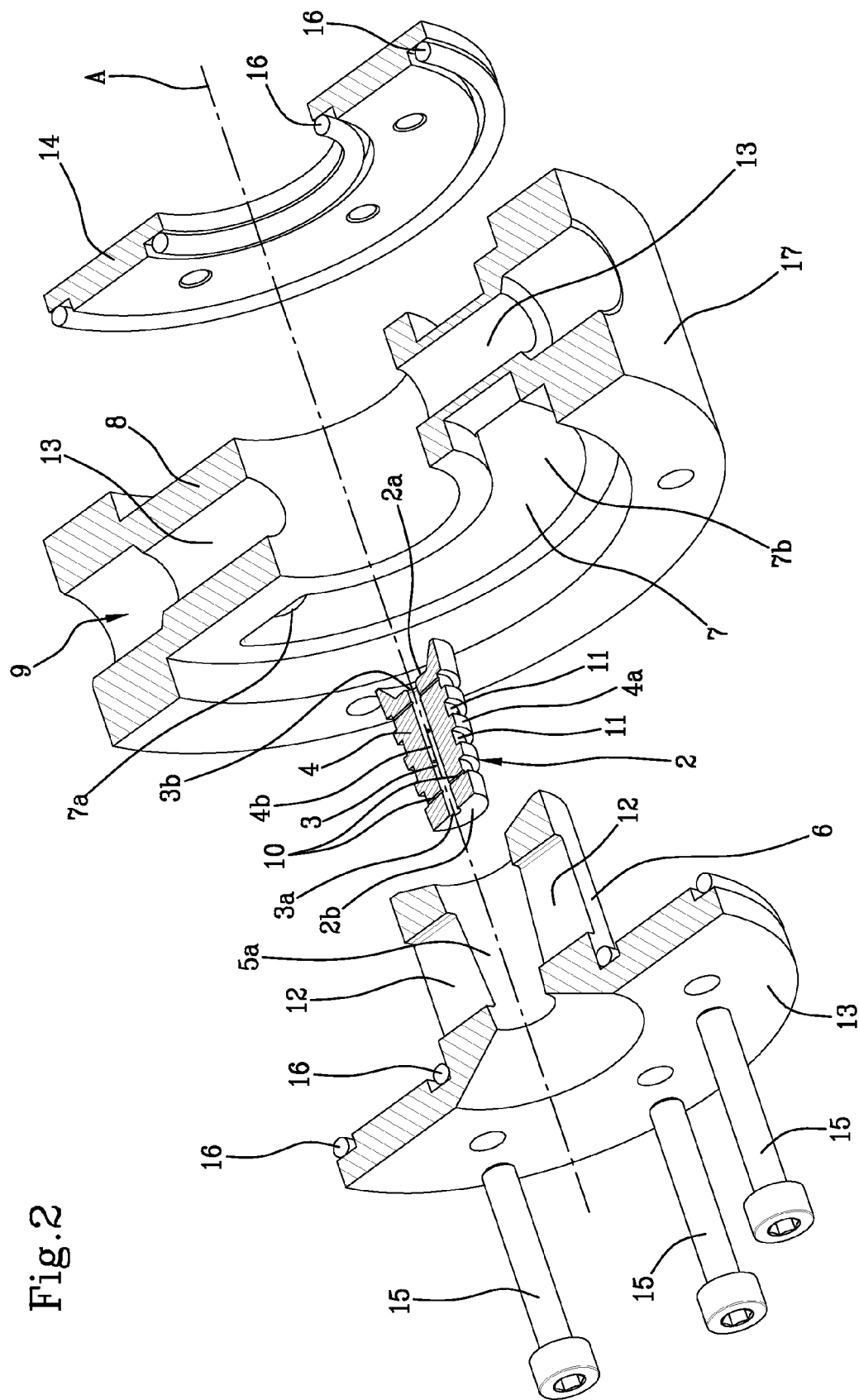
FIG. 2 is an exploded cross-section of the dry calibration device of FIG. 1.

With reference to the accompanying drawings, the numeral 1 denotes a dry calibration device according to this invention.

The device comprises a calibration head 2, in which a manufactured product being calibrated can be inserted (not illustrated). The calibration head also has a longitudinal axis of extension "A", an inlet end 2a and an outlet end 2b for the above-mentioned manufactured product. The inlet end 2a and the outlet end 2b are positioned along a longitudinal direction of extension "A" of the calibration head 2.

Moreover, the calibration head 2 comprises a wall 4 having an inner surface 4b, forming a calibration duct 3, and an outer surface 4a opposite the inner surface 4b. The purpose of the calibration duct 3 is to receive the manufactured product so as to perform the calibration. More specifically, the calibration duct 3 has an inlet section 3a and an outlet section 3b, positioned, respectively, at the inlet end 2a and the outlet end 2b of the calibration head 2. In other words, the calibration duct 3 also extends along the longitudinal axis of extension "A".

Figure 3:
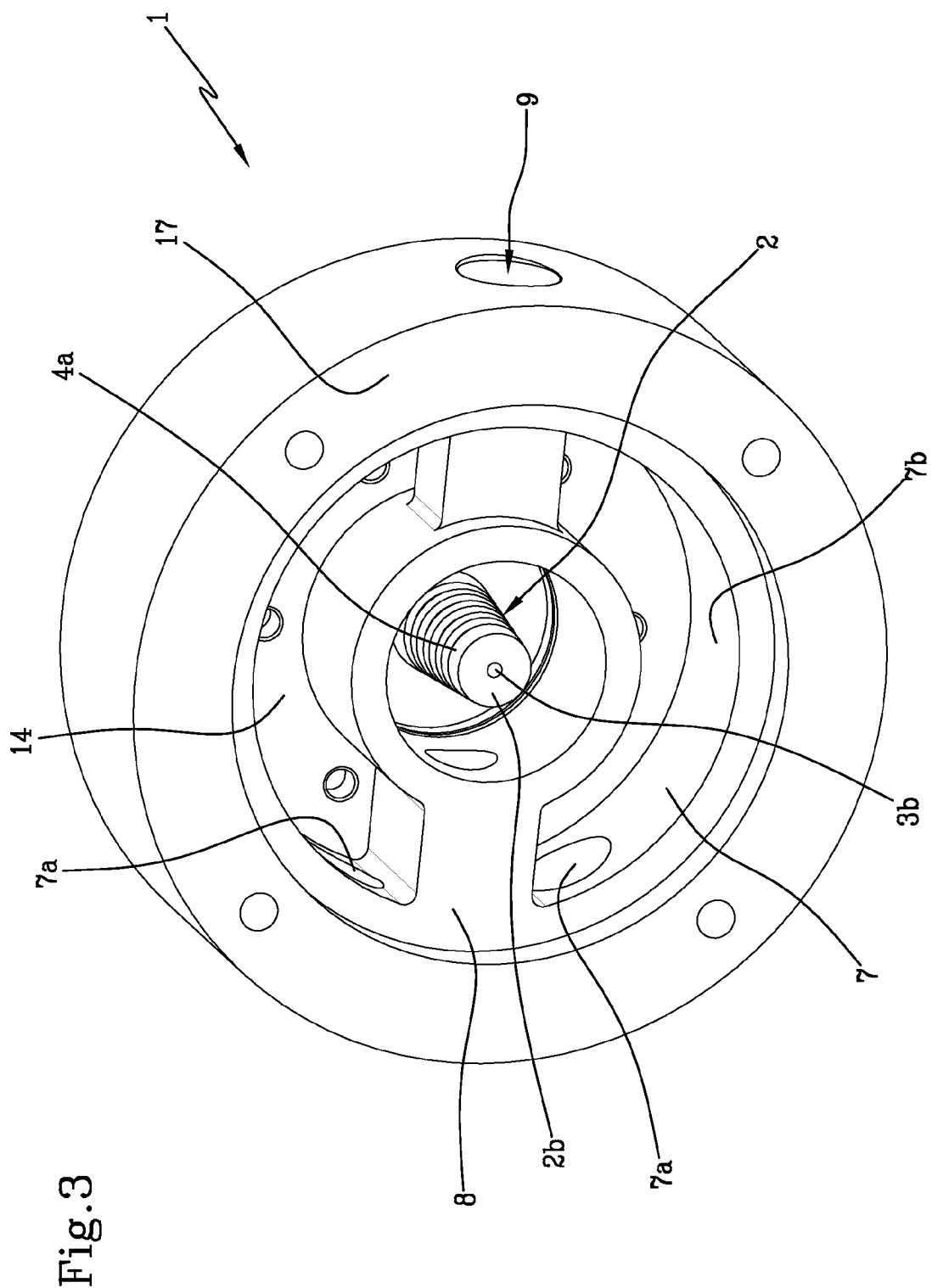
FIG. 3 is an perspective view of the dry calibration device of FIGS. 1 and 2 with some parts cut away to better illustrate others.

It should also be noted, with reference in particular to FIG. 3, that the calibration head 2 can have a different shape from the traditional and known regular cylindrical shape, and, more specifically, it can be conical. In other words, the longitudinal axis of extension "A" is an axis of symmetry of the calibration head 2.

In use, the pipe to be calibrated slides inside the calibration duct 3 from the inlet section 3a to the outlet section 3b.

It should also be noted that, in order to perform the heat exchange in a uniform manner, the calibration head 2 has a non negligible thermal capacity relative to the pipe to be calibrated. In other words, the wall 4 has a non negligible thickness relative to a diameter of the calibration duct 3. In order to facilitate the transfer of the heat (to or from the calibration head 2, according to the requirements at the time) it is also advantageous that the calibration head 2 be made of thermally conductive material.

In order to dissipate the heat extracted from the manufactured product, the device 1 comprises a heat exchange jacket 5 positioned in contact with the calibration head 2, more specifically in contact with the wall 4. Yet more specifically, the heat exchange jacket 5 is in contact with the outer surface 4a of the wall 4. The purpose of the heat exchange jacket 5 is typically to cool the calibration head 2 by circulating a cooling fluid, for example water. The heat exchange jacket 5 can also be used to heat the calibration head 2 by circulating inside it a heating fluid, for example oil.

At this point, the difference between this invention and the prior art must be stressed: in effect, whilst the axially discrete ducts present on the prior art calibration heads ensure a discontinuous heat exchange, the continuous contact between the heat exchange jacket 5 and the calibration head (that is to say: uniformly distributed on almost the entire lateral surface of the calibration head 2, excluding the geometrically negligible portions due to the presence of the suction ducts), allows the thermal energy in the head 2 to be removed or transferred in such a way as to guarantee an axial temperature profile which is almost constant at the surface of the cavity in which the calibration takes place.

In more detail, the heat exchange jacket 5 comprises a thermally conductive element 6 placed in direct contact with the outer surface 4a of the wall 4, that is to say, forming a contact surface 6a with the outer surface 4a of the wall 4. According to this invention, the contact surface 6a extends continuously along the above-mentioned longitudinal axis of extension "A" of the calibration head 2. In other words, cross-sectioning the calibration head 2 and the thermally conductive element 6 with a plane passing through the longitudinal axis of extension "A", the contact surface 6a defines a continuous line extending along the entire calibration head 2, that is to say, from the inlet end 2a to the outlet end 2b. In this way, the heat can pass from the calibration head 2 to the heat exchange jacket 5 (or vice versa) merely by conduction, in an extremely homogeneous manner in terms of calories transmitted per unit area.

In other words, the thermally conductive element 6 extends continuously from the inlet section 2a to the outlet section 2b. Advantageously, this prevents the periodic trend of the temperature profile inside the calibration head 2.

It should also be noted that the device 1 comprises a single thermally conductive element 6 of the type described above, which is able to cool (and, if necessary, heat) by itself the entire calibration head 2. The thermally conductive element 6 can be made in one piece, and, conveniently, it can be a single-block of thermally conductive material.

Advantageously, moreover, the thermally conductive element 6 completely encircles the calibration head 2. The heat exchange jacket 5 also comprises a support 17 for the thermally conductive element 6. Inside the support 17 there is a channel 7 for circulating cooling fluid (or, if necessary, heating fluid). The channel 7 is further delimited by a plate 13 made in one piece with the thermally conductive element 6 and by a counter-plate 14 opposite the plate and fastened to it by screws 15. The fluid-tight seal of the channel 7 is guaranteed by suitable seals 16 positioned between the plate 13, the counter-plate 14 and the support 17.

In more detail, the channel 7 surrounds the thermally conductive element 6, in such a way as to absorb by forced convection the heat extracted from the manufactured product to be calibrated. More specifically, the channel 7 substantially has a ring shape. In further detail, the channel has two openings 7a for the inflow and/or outflow of the cooling fluid. The openings 7a are located at an outer surface 7b of the channel 7. Moreover, as shown in particular in FIG. 3, the openings 7a are close to each other and are separated by a separator 8, in such a way as to force the cooling fluid to move along the entire channel 7 to flow from one opening 7a to the other.

In order to perform the effective calibration of the pipe holding the walls, the device 1 also comprises suction means 9 associated with the calibration duct 3. The suction means 9 comprise a plurality of suction ducts 10 made in the calibration head 2, and in particular in fluid communication with the above-mentioned calibration duct 3. The suction ducts 10 are oriented radially in such a way as to converge towards the longitudinal angle of extension "A" of the calibration head 2.

A plurality of cavities 11 are also made on the calibration head 2, more specifically on the outer surface 4a of the wall 4. In other words, the cavities 11 have the shape of rings made on the wall 4.

The suction means 9 also comprise at least one slot 12 located on the heat exchange jacket 5, in particular made inside the thermally conductive element 6. In more detail, the suction means 9 comprise two slots 12 located on opposite sides of the thermally conductive element 6. The suction means 9 also comprise at least one further suction duct 13. In further detail, the suction means 9 comprise a pair of further ducts 13 each associated with a respective slot 12 and with suction devices not illustrated. As shown in FIGS. 1 and 3, one of the further ducts 13 is advantageously housed in the above-mentioned separator 8.

In use, the cavities 11 on the calibration head 2 place the suction ducts 10 in communication with the above-mentioned slot 12. The air is sucked by the further suction ducts 13, so as to create the negative pressure inside the calibration duct 3.

According to this invention, the calibration head 2 converges from the inlet section 2a in the direction of the outlet section 2b. In the embodiment described and illustrated in the attached drawings, the calibration head 2 has a conical shape. Consequently, the recess 5a of the heat exchange jacket 5 also has a conical shape. More generally, it should be noted that the recess 5a has a shape which matches that of the calibration head 2.

In use, the inlet end 2a can directly face an extruder. In other words, the device 1 does not comprise a flange directly connected to the calibration head 2 in particular at the inlet end 2a.

According to another aspect of this invention, the device 1 can comprise a basin (not illustrated) associable with the outlet end 2b of the calibration head 2: the basin is interposed between the calibration head 2 and a device for the immersion in water of the manufactured product at the outlet from the calibration head 2. It should be noted that the basin has a drain for eliminating the cooling fluid and is designed to prevent a contact between the cooling fluid and the above-mentioned outlet end of the calibration head. In other words, the basin can be interposed between the calibration head and a further basin containing fluid, for example water, in which the manufactured product is immersed after the calibration operation. In this way, the water can overflow from the further basin towards the inside of the basin of the device 1 and, being removed by the drain, does not penetrate inside the calibration duct 3 where it could alter the shape of the manufactured product undergoing calibration (a drawback which could occur if the water is interposed between the manufactured product and the wall 4).

According to a further feature of this invention, it is advantageously possible that the basin described above associable with the outlet end 2b of the calibration head 2 comprises means for varying the distance between the outlet end 2b and an immersion point of a manufactured product emerging from the outlet end 2b: this operating feature can be used, for example, to vary certain characteristics of the manufactured product, such as, for example, the elongational capacities (which according to the prior art are proportional to the distance which the manufactured product travels between its outfeed from the calibration head and the point at which it is touched or is immersed in the cooling fluid).

In a possible embodiment of these means of varying the distance an overflowing wall is used, which is movably mounted in the basin and is placed at a predetermined front distance relative to the calibration head: the distance is then made selectable/adjustable by using suitable control and connection mechanisms, and the adjustment can be set both manually and automatically, for example with suitable electronic feedback control systems controlled by specific software which determines the optimum distance as a function of the parameters with which the manufactured product must be extruded and calibrated.

The invention achieves the set aims.

More specifically, the contact surface between the thermally conductive element and the calibration head extends continuously along the longitudinal axis of extension of the calibration head. Consequently, the heat is transmitted by conduction along the entire outer surface of the calibration head, evening out the temperature profile in the wall and, consequently, inside the manufactured product undergoing calibration. Also, the calibration head converges from the inlet section to the outlet section. This ensures that it is pushed against the thermally conductive element by the pulling action exerted by the manufactured product on the wall: consequently, since a connection flange is not necessary, there are no problems regarding its cooling and the occurrence of a temperature peak in the manufactured product is therefore avoided (in particular at the inlet section of the calibration head).

This invention achieves a major advantage. More specifically, the presence of a single thermally conductive element ensures that it is free of discontinuities, and therefore more efficient from the point of view of heat propagation.

Lastly, it should be noted that the technical solutions described (the thermally conductive element, the conical calibration head and the basin) can be implemented together or, if necessary, also separately.

The invention claimed is:

1. A dry calibration device (1) for extruders, comprising:
a calibration head (2) having a calibration duct (3) in which an article of manufacture can be inserted, said calibration head (2) further including:
   a longitudinal extension axis (A);
   an inner surface (4b) defining said duct (3); and
   an outer surface (4a) opposite to said inner surface (4b);
a heat exchange jacket (5) placed in contact with said calibration head (2), said heat exchange jacket (5) comprising:
   a thermally conductive element (6) placed in contact with said outer surface (4a) and defining a contact surface (6a) with said outer surface (4a), said contact surface (6a) extending without a break along said longitudinal extension axis (A);
   the thermally conductive element (6) being of one piece construction and fully surrounding said calibration head (2); and
suction means (9) associated with said calibration duct (3),
wherein the heat exchange jacket (5) comprises a support (17) for the thermally conductive element (6), inside the support (17) there being a channel (7) for circulating cooling or heating fluid, said channel (7) surrounding the conductive element (6);
wherein said suction means (9) comprise a plurality of suction ducts (10) made in the calibration head (2) and in fluid communication with said calibration duct (3),
wherein said suction means (9) comprise two slots (12) located on the heat exchange jacket (5) and on two opposite sides of said thermally conductive element (6), and wherein
said two slots (12) are in communication with said plurality of suction ducts (10) by means of cavities (11) made on a wall (4) of the calibration head (2),
and said suction means (9) comprise a pair of further ducts (13) each associated to a respective slot (12) of said two slots (12).

2. The device according to claim 1, characterised in that said calibration head (2) is of conical shape, said heat exchange jacket (5) having a conical recess (5a) for receiving said calibration head (2).

3. The device according to claim 1, characterised in that said calibration head (2) has an inlet end (2a) and an outlet end (2b) opposite to said inlet end (2a), said calibration head (2) having a convergent shape from said inlet section (2a) in the direction of said outlet section (2b), said heat exchange jacket (5) being provided with a recess (5a) the shape of which matches that of said calibration head (2).

4. The device according to claim 1, characterised in that it does not comprise a flange directly connected to an inlet end (2a) of said calibration head (2).

* * * * *